United States Patent [19]

Huber et al.

[11] Patent Number: 4,566,722
[45] Date of Patent: Jan. 28, 1986

[54] PIPE JOINT CONSTRUCTION FOR REMOTELY CONTROLLED CONNECTION AND DISCONNECTION

[75] Inventors: Johann Huber; Lutz Lorenz, both of Dortmund, Fed. Rep. of Germany

[73] Assignee: Uhde GmbH, Dortmund, Fed. Rep. of Germany

[21] Appl. No.: 684,809

[22] Filed: Dec. 21, 1984

[30] Foreign Application Priority Data

Dec. 21, 1983 [DE] Fed. Rep. of Germany ....... 3346069

[51] Int. Cl.$^4$ .............................................. F16L 17/02
[52] U.S. Cl. ...................... 285/18; 285/332; 403/15; 29/426.6; 29/525; 29/DIG. 44
[58] Field of Search .................... 285/18, 332; 403/15; 29/426.6, DIG. 44, 446, 525

[56] References Cited

U.S. PATENT DOCUMENTS

| 2,374,348 | 4/1945 | Harding | 285/332 |
|---|---|---|---|
| 3,267,568 | 8/1966 | Johnson et al. | 29/446 |
| 3,620,554 | 11/1971 | Ward | 285/18 |
| 3,694,894 | 10/1972 | Jelinek et al. | 29/DIG. 44 X |
| 4,090,822 | 5/1978 | Mount et al. | 403/15 X |
| 4,124,233 | 11/1978 | Ahlstone | 285/18 |
| 4,198,076 | 4/1980 | Mezei | 285/18 |
| 4,349,291 | 9/1982 | Geary, Jr. | 403/15 |
| 4,432,569 | 2/1984 | Wietecha | 285/18 |

FOREIGN PATENT DOCUMENTS 567191 9/1975 Switzerland ............ 403/15

Primary Examiner—Thomas F. Callaghan
Attorney, Agent, or Firm—Toren, McGeady, Stanger, Goldberg & Kiel

[57] ABSTRACT

A pipe joint is made up of a female pipe end with a conically shaped engagement surface and a male pipe end with a corresponding conically shaped engagement surface engageable with the engagement surface of the female pipe end. The combination of the female and male pipe ends form a sealed chamber. By maintaining a vacuum within the chamber the pipe ends can be placed in tightly fitting contact and by introducing a pressurized medium within the chamber the contact between the pipe ends can be broken.

5 Claims, 2 Drawing Figures

PIPE JOINT CONSTRUCTION FOR REMOTELY CONTROLLED CONNECTION AND DISCONNECTION

BACKGROUND OF THE INVENTION

The present invention is directed to a pipe joint made up of a female pipe end and a male pipe end each having a corresponding conically shaped engagement surface. With the engagement surfaces of the pipe ends in contacting relation, the pipe joints can be connected or disconnected by remotely controlled means.

Pipe joints of this general type have recently gained increased significance in nuclear technology, especially for reprocessing plants, because many parts of such plants do not allow direct access to the operating personnel so that all necessary assembly and disassembly work must be carried out by remote-controlled slave arms. The most common situation is the one requiring rapid remote-controlled nondestructive disconnection and reconnection of pipe joints. In the past suitable pipe joints have been complicated and required special slave arms, because the sealed connection requires rotary movements to be carried out. It is also true in a known pipe joint where an axially movable end provided with claws must grip behind projections on a stationary end of the joint. Operations for tightening of the claws require the spindle to be turned while a press bar acts on the claws to move them in the axial direction.

SUMMARY OF THE INVENTION

The primary object of the present invention is to provide a pipe joint of simple design which does not require complicated slave arms and needs only the performance of an axial movement for the insertion and withdrawal of the movable end.

Another feature of the invention is the simplification of the sealing surfaces for avoiding the use of special sealing elements, such as packing and the like.

In accordance with the present invention, in the pipe joint a pressure chamber is formed between the two pipe ends and remote-controlled means are provided in combination with the pressure chamber so that a vacuum can be established within the chamber for firmly joining the pipe ends together in the region of contacting, correspondingly conically shaped surfaces. In addition, a pressurized medium can be introduced into the chamber for breaking the contacting engagement between the pipe ends.

In such an arrangement the pipe ends can be easily fabricated from a small number of parts and, in particular, a simple axial movement is all that is required for inserting or removing the movable end from the stationary end for connecting or disconnecting the pipe joint so that a slave arm of simple design may be used.

It is advantageous to close the pressure chamber from the enclosing atmosphere by a sealing ring inserted between the axially extending surfaces of flanges on the pipe joint ends, so that a vacuum becomes effective as soon as the axially extending surfaces are in opposed relation and back pressure formed by the elasticity of the sealing ring can be avoided.

Another advantageous feature of the invention is that the conically shaped contacting surfaces form such a small angle with the axis of the pipe ends that, without using any special sealing means, a tight joint is obtained by the metallic conically shaped surfaces. Further, at least one of the two pipe ends forming the joint is shaped to provide the pressure chamber for effecting axial movement of at least one of the pipe ends between a pair of stop collars so that by introducing a rapid supply of a pressurized medium into the pressure chamber, a propulsive force is exerted on the pipe ends forming the joint whereby the conically shaped surfaces are separated from one another.

With this arrangement the configuration of the sealing surfaces ensures the prolonged life expectancy of the pipe joint so that further operations, such as the replacement of packing and the like is unnecessary. The conically shaped enagement or sealing surfaces can be disposed at a very small angle of inclination to the axis of the pipe joint affording an optimim sealing effect, because the application of propulsive force onto the movable part of at least one of the pipe ends forming the joint guarantees a reliable disconnection of the conically shaped surfaces in spite of the very small angle of inclination. In view of the reliability of separating the pipe ends, the angle of inclination of the conically shaped engagement surfaces may be selected so small that once the mechanical connection between the surfaces is achieved by static friction, the tightness of the seal is maintained even if the vacuum formed in the pressure chamber for pressing the pipe ends together is not maintained and as long as the pressure within the pipe joint does not exceed certain definite values which applies to a great number of services.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
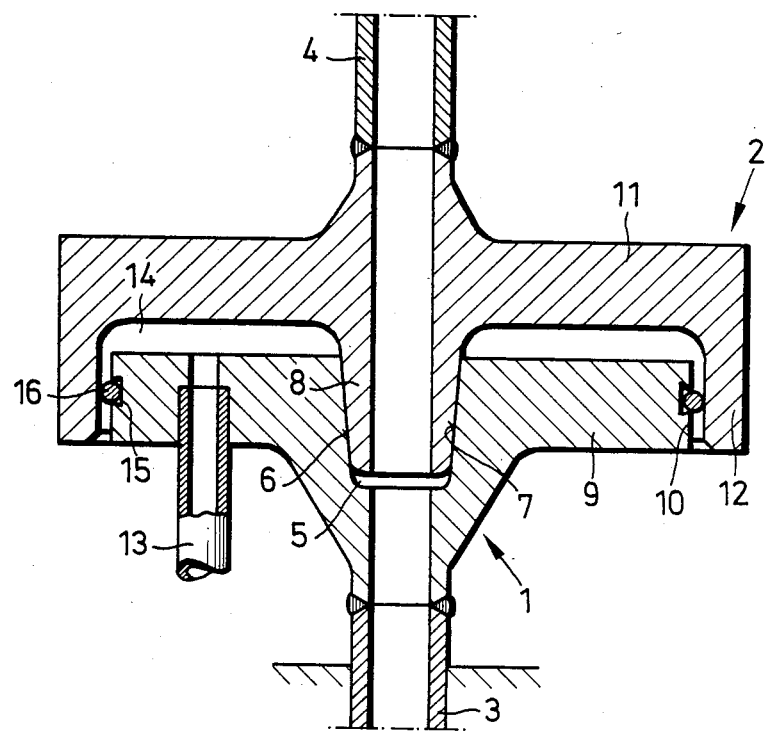
FIG. 1 is an axially extending cross-sectional view of the basic arrangement of a pipe joint embodying the present invention.

In the embodiment of the invention shown in FIG. 1, the pipe joint is made up of two parts, a stationary female pipe end 1 and an axially movable male pipe end 2. An axially extending pipe section 3 is secured to the female pipe end 1 and another pipe section 4 is secured to the male pipe end 2. As viewed in FIG. 1, the two pipe ends 1, 2 are secured together. The female pipe end 1 has a centrally arranged recess 5 with an axially extending conically shaped engagement surface 6. The male pipe end 2 has an axially projecting element 8 with a radially outer conically shaped surface 7. The conically shaped surfaces 6, 7 correspond to one another with regard to the angle of inclination relative to the axis of the pipe joint so that the two surfaces interfit in close engagement.

Female pipe end 1 has a radially outwardly extending flange 9 at its end adjacent the male pipe end 2. Flange 9 has an axially extending flange surface 10 defining the radially outer surface of the flange. Similarly, the male pipe end 2 has a radially outwardly extending flange 11 and the radially outer edge of the flange has an axially extending flange wall 12 laterally encircling the flange surface 10 on the female pipe end 1. In effect, the flange 11 defines an annular recess between the projecting element 8 and the flange wall 12.

Extending axially through the flange 9 of the female pipe end 1 is a conduit 13 which opens into a pressure chamber 14 defined between the juxtaposed surfaces of the flanges 9 and 11 after the projecting element 8 is axially inserted into the recess 5. The pressure chamber 14 is sealed by a ring 16 seated into a dovetailed groove 15 extending circumferentially around the radially outer surface 10. The ring 16 extends into sealing contact with the radially inner surface of the flange wall 12.

The pipe joint described above is connected and disconnected as follows:

In assembling the pipe joint, the axially projecting element 8 of the male pipe end 2 is moved in the axial direction by a simple slave arm into the conically shaped recess 5 of the female pipe end. When a full-face contact is effected between the corresponding conically shaped surfaces 6 and 7, a vacuum is established in the pressure chamber 14 through the conduit 13 and the two pipe ends 1 and 2 are pressed firmly against one another affording a tightly fitting seal in the axially extending region of the conically shaped surfaces 6 and 7. The relatively small angle of inclination of the conically shaped surfaces results in such a perfect seal that additional sealing means, such as packing or sealing rings, can be omitted. The omission of such sealing rings is of special importance in reducing replacement operations on the pipe joint. To disassemble or disconnect the pipe joint, a pressurized medium is introduced through the conduit 13 into the pressure chamber 14 causing the two pipe ends 1 and 2 to move axially apart. Subsequently the male pipe end 2 can be withdrawn using the same simple slave arm used in fitting the two pipe ends together.

Figure 2:
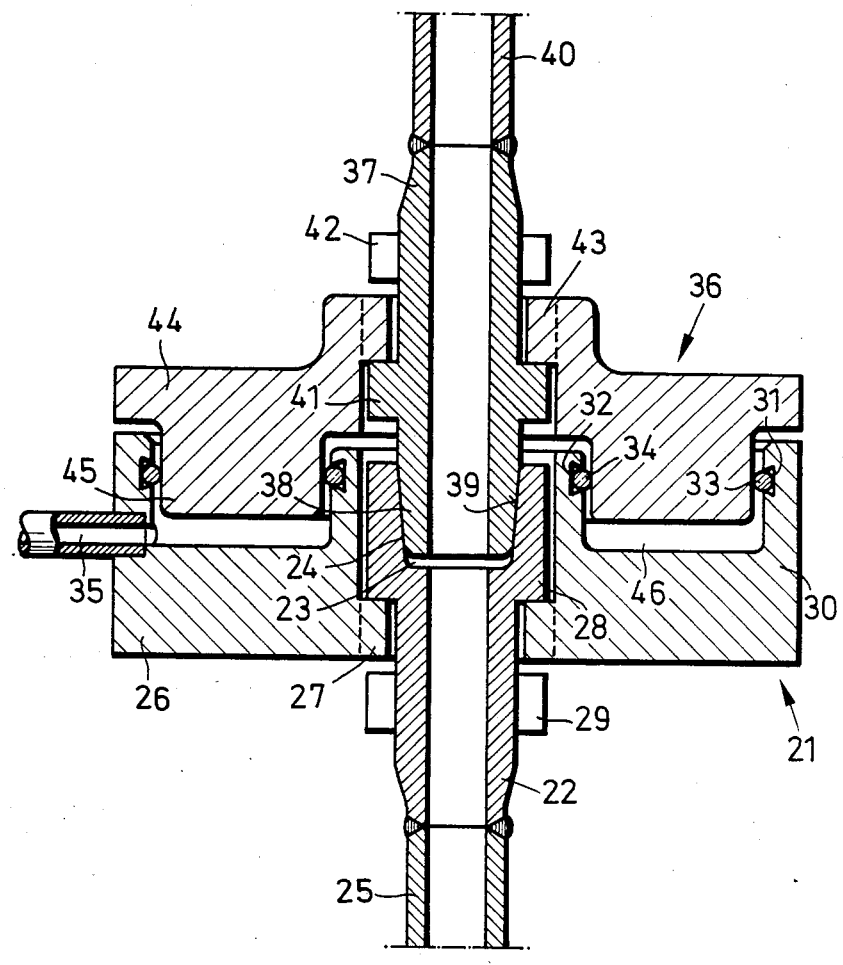
FIG. 2 is an axially extending sectional view, similar to FIG. 1, illustrating a further embodiment of the invention with additional means for facilitating the disconnection of the pipe joint ends.

In a second embodiment of the invention shown in FIG. 2, the pipe joint is made up of a stationary female end 21 and an axially movable male pipe end 36. Each of the female pipe end and male pipe end is constructed as a two-part member. The female pipe end 21 is made up of a radially inner or central part 22 and a radially outer part 26. Central part 22 forms an axially extending recess 23 having a conically shaped surface 24 encircling and facing inwardly toward the axis of the pipe joint. Central part 22 is welded to an axially extending pipe section 25 at the opposite end from the recess 23. Outer part 26 laterally encloses the central part 22 at the end containing the recess 23 and the outer part is loosely mounted on the central part so that it can move in the axial direction. The outer surface of the central part 22 is stepped inwardly. Outer part 26 is an annular member and it has an inwardly extending stop ring 27 on its radially inner surface located between two stop collars 28 and 29 on the central part 22. The stop collar 28 is formed by the outer stepped surface of the central part 22 and the other stop collar 29 is spaced axially from the stop collar 28 and extends around the outside surface of the central part. The end of the outer part 26 facing toward the male pipe end 36 has an annular shaped recess 30 defined between axially extending side walls arranged concentrically relative to one another around the central axis of the pipe joint. The axially extending facing surfaces of the side walls are provided with dovetailed grooves 31 and 32 in which seal rings 33 and 34 are positioned. Further, a conduit 35 extends into the outer part 26 and opens into the annular recess 30.

The male pipe end 36 is also made up of two parts. A central part 37 has an axially extending annular projecting element 38 with an axially extending conically shaped radially outer surface 39 corresponding to the conically shaped surface 24 in the recess 23 of the female pipe end 21. Central part 37 is welded to an axially extending pipe section 40 and, similar to the arrangement of the central part 22 of the female pipe end 21, two axially spaced stop collars 41 and 42 are provided on the outside surface of the central part. Stop collar 41 is provided by an outwardly stepped portion of the central part while stop collar 42 is formed by a member encircling and secured to the outer surface of the central part. Further, the male pipe end 36 has an annular outer part 44 laterally encircling the central part 37. At its end spaced from the projecting element 38, the outer part has an inwardly extending stop ring 43 located between the stop collars 41 and 42. The outer part 44 is loosely mounted on the central part 37 so that it is axially movable between the two stop collars 41 and 42. Further, on its end surface facing toward the outer part 26 of the female pipe end 21, the outer part 44 has an annular neck or projection 45 arranged to fit into the annular recess 30 in the outer part 26 of the female pipe end 21. When the conically shaped surface 39 on the projecting element 38 is inserted into full surface contact with the conically shaped surface 24 within the recess 23 in the female pipe end 21, the juxtaposed surfaces of the annular recess 30 in the female pipe end and the annular projection 45 on the male pipe end define a pressure chamber 46 which is sealed due to the rings 33 and 34.

The pipe joint illustrated in FIG. 2 functions in the following manner:

The female and male pipe ends 21, 36 are fitted together in the same manner as described for the embodiment in FIG. 1, that is, male pipe end 36 is moved axially into the female pipe end 21 by using a simple slave arm. When full surface contact of the conically shaped surfaces 24 and 39 has been reached, a vacuum is established in the pressure chamber 46 through conduit 35 causing the conically shaped surfaces to be pressed firmly against one another in a perfect sealing manner without the use of any additional sealing means. To disconnect the pipe joint, a pressurized medium is rapidly and repeatedly introduced into the pressure chamber 46 through the conduit 35 causing the stop rings 27 and 43 on the axial movable outer parts 26 and 44 of the female and male pipe ends 21 and 36 to exert propulsion pulses against the outer stop collars 29 and 42 of the two pipe ends so that the mechanical interconnection afforded by static friction between the conically shaped surfaces 24 and 39 is quickly and reliably released. Subsequently, removal of the male pipe end 36 by the simple slave arm mentioned above can be effected. The embodiment in FIG. 2 permits the conically shaped surfaces to form a particularly small angle of inclination with the central axis of the pipe joint for improving the quality of the connection between these surfaces. When these surfaces 24 and 39 initially engage in full surface contact, a very tight mechanical connection is formed by static friction and the tightly fitting connection is maintained even if the vacuum applied to the pressure chamber 46 is released. The connection is maintained unless certain definite pressures are exceeded within the pipe joint.

The embodiments as described may be varied in many respects without departing from the fundamental concept of the invention. For example, it would be sufficient to provide the movable male pipe end with the axially movable outer part for effecting the propulsion pulses acting on the corresponding central part. Other simplifications might be envisaged, for instance, by omitting the outer axially extending walls 12 of the flange 11 as set forth in FIG. 1 and locating the sealing ring in a groove adjacent the circumferential outer edge of the flange 9 facing toward the flange 11. Further, with regard to the embodiment of FIG. 1, the axially extending wall 12 on the flange of the male pipe end 2 may be used to receive propulsion pulses from suitable implements for facilitating the disconnecting procedure.

The female and male pipe joint ends and their associated flanges may also form an integral part of a valve, a process vessel, or a machine such as a pump and the like.

While specific embodiments of the invention have been shown and described in detail to illustrate the application of the inventive principles, it will be understood that the invention may be embodied otherwise without departing from such principles.

We claim:

1. Pipe joint comprising a female pipe end having an axially extending tubular passage and a male pipe end engageable with said female pipe end and having an axially extending tubular passage in general axial alignment with said female pipe end tubular passage, said female pipe end having a conically shaped engagement surface and said male pipe end having a correspondingly shaped engagement surface for engagement with said engagement surface on said female pipe end, remotely controllable means for connecting and disconnecting said female and male pipe ends, each of said female pipe end and male pipe end having an end surface extending transversely of the axial direction of the tubular passages therethrough, said end surfaces combining to form a chamber when said conically shaped engagement surfaces are in contacting engagement, and means for establishing a vacuum within said chamber for placing said conically shaped engagement surface in closely fitting relation and for introducing a pressurized medium into said chamber for displacing said conically shaped engagement surfaces axially apart.

2. Pipe joint, as set forth in claim 1, wherein a sealing ring is provided between said end surfaces forming said chamber for forming a seal between said chamber and the ambient atmosphere about the pipe joint.

3. Pipe joint, as set forth in claim 1, wherein said conically shaped engagement surfaces define a small angle of inclination with the axis of said pipe ends, and at least one of said female pipe end and male pipe end comprising a two part member, said two part member comprising a radially inner part containing said conically shaped engagement surface and an annular radially outer part encircling said inner part, said radially outer part being axially movable relative to said inner part, and stops located on said inner part spaced apart in the axial direction and said radially outer part being axially displaceable between said stops so that, when a pressurized medium is supplied into said chamber a propulsion pulse can be exerted for axially displacing said radially outer part and effecting the disengagement of said conically shaped engagement surfaces.

4. Pipe joint, as set set forth in claim 1, wherein said female pipe end comprises an inner part forming the axially extending tubular passage and a flange formed integrally with and extending outwardly from one end of said inner part, said inner part having a recess formed inwardly from the end thereof at which said flange is located and said recess extending around said axially extending tubular passage, said male pipe end comprising an inner part having an axially extending projection at one end and a radially outwardly extending flange at the other end, said projection forming said conically shaped engagement surface on the radially outer axially extending surface thereof and arranged to be inserted into said recess in said female pipe end in closely fitting engagement with said conically shaped engagement surface therein, said flange on said male pipe end defining an annular recess and said flange on said female pipe end extending into said annular recess when said conically shaped engagement surfaces are in contacting engagement so that said flanges form said pressure chamber, and a conduit extending through one of said flanges and opening into said pressure chamber for selectively establishing a vacuum or introducing a pressurized medium into said chamber.

5. Pipe joint, as set forth in claim 1, wherein said female pipe end comprising an axially extending inner central part and a radially outwardly extending flange part mounted on said central part so that said flange part is movable axially relative to said central part, means on said central part for limiting the axial movement of said flange part relative to said central part, said central part having a recess formed in one end thereof and opening into the axially extending tubular passageway, said recess having axially extending surfaces forming said conically shaped engagement surfaces, said male pipe end comprises a two part member including a central part forming the axially extending tubular passage and a flange part laterally encircling said central part and being axially displaceable on said central part, means on said central part for limiting the axial displacement of said flange part relative to said central part, said central part of said male pipe end having an axially extending projection at one end thereof with the radially outer axially extending surface thereof forming said conically shaped engagement surface so that said projection is insertable into said recess in said central part of said female pipe end for affording closely fitting relation between said conically shaped engagement surfaces, and said means for establishing a vacuum and for introducing a pressurized medium and comprises a conduit member located within one of said flange parts, each of said flange parts defining one of said end surfaces forming said chamber and said conduit extending into said chamber.

* * * * *